United States Patent [19]

Moore, III et al.

[11] Patent Number: 4,494,671
[45] Date of Patent: Jan. 22, 1985

[54] AUTOMOBILE BODY PANEL HOLE CLOSURE

[75] Inventors: Dan T. Moore, III; Michael F. Fischer, both of Cleveland Heights; Laurie S. Herceg, Lakewood, all of Ohio

[73] Assignee: The Dan T. Moore Co., Cleveland, Ohio

[21] Appl. No.: 570,184

[22] Filed: Jan. 12, 1984

[51] Int. Cl.³ .............................. B65D 51/18
[52] U.S. Cl. ................................ 220/256; 220/359
[58] Field of Search ............. 220/256, 307, 308, 359

[56] References Cited

U.S. PATENT DOCUMENTS

| 4,094,436 | 6/1978 | Birmingham | 220/308 |
| 4,359,169 | 11/1982 | Helms et al. | 220/359 |
| 4,391,384 | 7/1983 | Moore et al. | 220/359 |

Primary Examiner—George T. Hall
Attorney, Agent, or Firm—Pearne, Gordon, Sessions, McCoy, Granger & Tilberry

[57] ABSTRACT

A closure for a hole in a panel, such as a body panel in an automotive vehicle, is provided. The closure includes a plate with dimensions which are complementary to the hole. A gasket member is secured to the top of the plate. The plate includes means to secure the plate to the body panel. The gasket has dimensions which are somewhat larger than the hole, so that the gasket overlies the panel defining the hole, as well as the plate. The gasket has a first or bottom side low melt layer and a second or top side copolymer layer. The total thickness of the gasket ranges from about 0.0030 inch to about 0.0065 inch. Upon exposure to elevated temperatures during baking, the gasket melts over the plate and adheres to the panel to cause a seal between the plate and the panel.

12 Claims, 4 Drawing Figures

U.S. Patent   Jan. 22, 1985   4,494,671
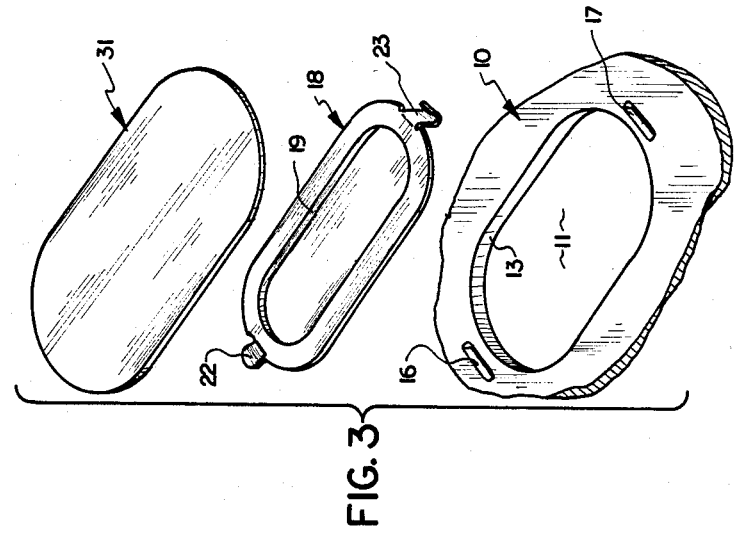
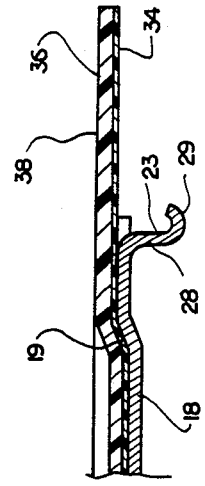
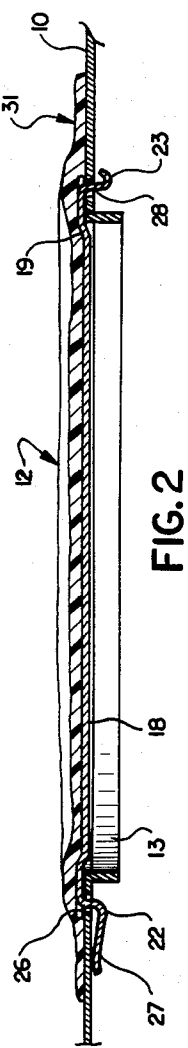
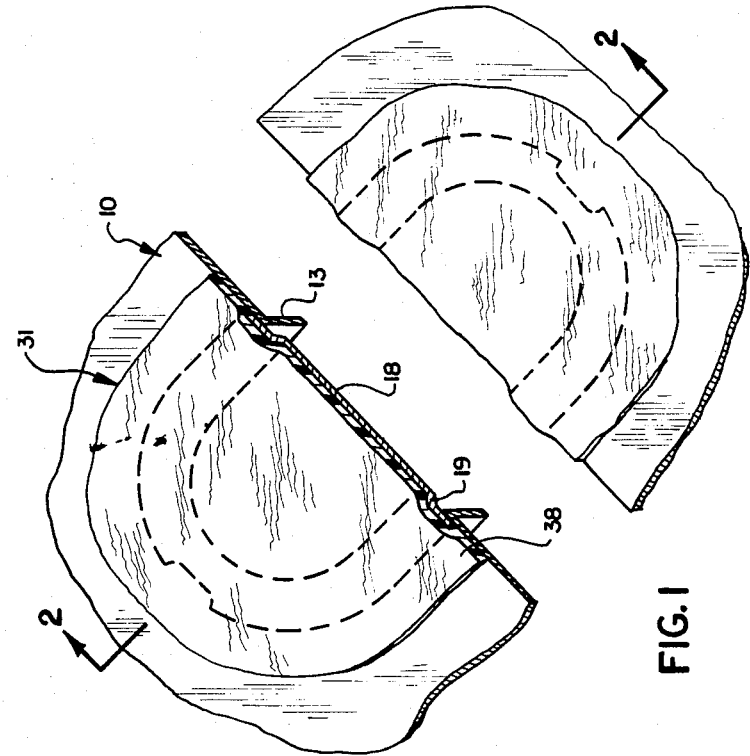

AUTOMOBILE BODY PANEL HOLE CLOSURE

BACKGROUND OF THE INVENTION

This invention relates to an improved closure for covering and sealing an aperture in a panel such as an automobile body and, in particular, to closures which include heat-activated gasket means for effecting a liquidtight seal with a panel over an associated aperture.

PRIOR ART

Panels and similar elements in various products, appliances, and structures are provided with apertures which subsequently require closures. For example, in the automotive industry, the vehicle body is provided with apertures in the floor panels or side walls which serve as gate holes to index the panel in a fixture, or as drain holes for excess rustproofing, primer, and/or paint applied in a dip tank. It is subsequently necessary, after these apertures have served their function, to close them to exclude moisture, dirt, noise, and exhaust fumes. Examples of these sorts of closures are shown in U.S. Pat. Nos. 3,990,604 to Barnett et al, 4,290,532 to Morel, 4,049,436 to Birmingham, 4,290,536 to Morel, and reissue U.S. Pat. No. Re. 30,326 to Van Buren. Also relevant is U.S. Pat. No. 4,391,381 to Moore and Fischer and assigned to the same assignee as the present application. These patents generally describe a rigid closure plate with a plurality of resilient retaining fingers and a sealing gasket which mates with the bottom side of the closure plate and the top side of the body panel surrounding the opening, in order to cause a seal between the closure plate and the body panel. This gasket is intended to melt and to flow into place so as to cause a seal between the closure plate and the perimeter of the hole. The effectiveness of the seal carried with these panels depends on a relatively high temperature during baking, which causes expansion or flowing of the gasket or its sealing ring to cause sealing.

SUMMARY OF THE INVENTION

The subject invention provides a panel hole closure or plate having a gasket secured to the top of the plate which is activated by low baking temperatures to cause sealing at the edges of the plate. The closure comprises a rigid plate with an overlying attached gasket preform consisting of a lower low melt compound layer with a high melt index and a top compound layer with a low melt index. Upon exposure to elevated temperatures during an initial baking cycle which sets the primer coat, the activation and melting of the lower low melt layer and the softening or melting of the top compound layer establish an efficient sealing contact with the closure plate and the surfaces of the panel surrounding the closure plate. This is followed by setting of the gasket material. The panel and plate are subjected to further periods of elevated temperature during re-bake cycles when subsequent coats of surface finish are baked. The present invention must seal the panel hole and must retain that seal even after being subjected to subsequent baking periods.

While the prior art seals the plate to the panel by flowing the gasket between the plate and the panel, in the present invention the plate cooperates with the panel edges. Upon initial exposure to a higher temperature, such as upon baking, a first low melt compound layer melts and adheres to the panel; then a second compound layer melts and conforms around the edge of the plate. The gasket seals the plate to the panel by flowing over the plate and adhering to both the plate and the panel. Since it seals in this way, the present invention will seal relatively wider gaps between the plate and panel. The gaskets which expand to cause sealing between the plate and panel will only expand 300%. This is often insufficient to account for variations or discrepancies in the plate and panel fit. The present invention provides a thinner and less obtrusive closure than is known in the prior art.

The present invention is also designed to provide an effective sealing upon subjection to the lower baking temperatures which have been introduced by the automotive industry in order to save energy and maintain its seal when subjected to subsequent re-baking temperatures. In one preferred embodiment, the two layers of the gasket material are co-extruded, and then blanked from sheet stock. However, other methods of laminate formation may be used. The gasket blank is then heat-staked to the rigid plate constructed from galvanized metal. The rigid plate is provided with mounting tabs which engage slots in the panel in the vicinity of the hole to secure the plate and gasket to the panel prior to sealing.

BRIEF DESCRIPTION OF THE DRAWINGS

FIG. 1 is a perspective, fragmentary view of a panel provided with a hole covered by a closure embodying the invention;

FIG. 2 is a sectional view of the panel enclosure taken along line 2—2 indicated in FIG. 1;

FIG. 3 is an exploded, perspective view of the closure plate and gasket preform prior to their assembly; and FIG. 4 is an enlarged view of the assembled gasket and plate prior to assembly on the body panel, showing the layers of the gasket. This view is exaggerated for purposes of illustration and is not to scale.

DESCRIPTION OF THE PREFERRED EMBODIMENT

Referring to FIGS. 1 and 3, a panel 10 is provided with a hole 11 and a closure 12 plugging the hole. The disclosed panel represents, for example, a typical floor panel in an automobile or other vehicle. In the usual case, the panel 10 is fabricated from steel stock. The hole 11 is punched or otherwise formed in the panel 10, and may have its perimeter bounded by a continuous lip or flange 13 integral with the remainder of the panel and substantially perpendicular to the plane of the panel. In the prior art, this lip is necessary to keep the gasket material from melting out the hole between the panel and the plate. The lip is shown in this embodiment of the present invention; however, the need for this lip has been eliminated by the present invention. The sealing efficiency of the present invention does not depend upon the presence of this lip, since the plate meets the edges of the hole and the gasket overlies the plate and the panel. Moreover, the gasket will not melt out between the plate and the panel but, rather, melts around the edges of the plate to form the seal.

In the illustrated case, the hole 11 is oblong in plan view. The hole can serve to gauge the position of the panel 10 during manufacture and assembly processes and also as a drain for excess primer, rustproofing, and paint, where the panel 10 is immersed in a dip tank or is otherwise flooded with a liquid coating. At each end of the hole 11 in the panel 10, identical elongate openings 16 and 17, transverse to the length of the hole 11 and symmetrical with respect to the hole, are punched or otherwise formed in the panel for the engagement of the mounting means of the panel closure.

Referring to FIG. 3, the closure 12 comprises a plate body 18 of rigid sheet metal having dimensions corresponding to, and preferably slightly larger than the hole 11. In automotive vehicle use, the closure 18 can be sheet steel which is galvanized on one or both sides for corrosion resistance and is in the order of 0.015 to 0.030 inch thick. A shallow embossment or depression having its outline designated by the numeral 19 may be provided to stiffen the plate 18.

Means for attaching or mounting the plate 18 on the panel 10 comprise tabs 22 and 23 at opposed ends of the plate. Referring to FIG. 2, one tab 22, which is rigid and preferably integral with the plate 18, is generally L-shaped in cross section having a portion 26 proximate to the plate 18 and a portion 27 distal from the plate and extending generally parallel to the plate. The distal portion 27 fits in the hole 16. The opposite tab 23 is generally J-shaped in cross section, as viewed in FIG. 3, with a proximate stem portion 28 generally perpendicular to the plane of the plate 18 and a distal hook portion 29 extending obliquely to the plane of the plate. The hook 29 and stem portion 28 fit into hole 17.

The closure 12 also includes a body 31 which is originally supplied as a flat annular body in the order of about 0.020 inch to about 0.080 inch thick, and more particularly from about 0.030 inch to about 0.065 inch.

The illustrated gasket body 31 is cut from a wedge of sheet material in any suitable known manner, such as die cutting. The material of the gasket body comprises two polymer (or copolymer) compound layers, as will be later described. In the illustrated case, the gasket body 31 has the configuration of the plate 18, but with its outer periphery somewhat larger than the plate, so that the gasket extends over both the plate and the panel body when the closure 12 is in place on the panel 10.

It should also be understood that the gasket body 31 may be formed with an aperture (not shown) which corresponds to the central portion of the plate 18, or, for example, to the depression 19. This aperture is only provided as a means to save gasket material. Since it is non-functional, the size is unimportant. It is important only that sufficient gasket material remains to form a sufficient overlap of the plate and panel surface surrounding the plate to cause good sealing.

The gasket consists of a lower low melt compound layer 34 and an upper compound layer 36. The lower low melt layer has a melt index of 100 to 125, and more particularly from 110 to 115. Melt index is a measure of the amount in grams of a thermoplastic resin which can be forced through an orifice of 0.0825 inch diameter when subjected to a force of 2160 grams in 10 minutes at 190° C. The test is performed by an extrusion rheometer described in ASTM D 1238. Resins having low melt index have a high molecular weight, and those with a high melt index have a low molecular weight. *Whittington's Dictionary of Plastics*, L. Whittington, Technomic Publishing, 1968.

The thickness of this low melt compound layer should be from 0.003 to 0.015 inch, and more particularly from 0.005 to 0.012 inch. The layer must be thick enough to maintain good adhesion through the environmental testing. The bottom layer comprises ethylene vinyl acetate copolymers and calcium hydroxide (hydrated lime) to provide an alkali environment to prevent corrosion of the metal, and a compatible tackifier such as Vinsol (manufactured by Hercules).

The combination for the bottom layer of two ethylene vinylacetate (EVA) copolymers both manufactured by DuPont was found to give particularly satisfactory results. The first EVA (DuPont Elvax 265) copolymer has a melt index of 2–4, and more specifically of 2.6–3.4. This copolymer is used in the range of 20–30 parts per hundred parts of resin by weight (parts per hundred). The second EVA polymer (DuPont Elvax 210) has a melt index of 300–500, and more specifically 365–440, and is used in the range of 70–80 parts per hundred. The lime added was in the range of 10–20 parts per hundred. The tackifier Vinsol, manufactured by Hercules, was also added in the range of 10–20 parts per hundred.

The top compound layer 36 of the gasket body 31 is a more rigid material with a melt index ranging from 3.0 to 8.0, and more particularly from 5.0 to 6.0. The thickness of this compound layer should be thin enough that the layer melts and conforms to the plate without being obtrusive, but thick enough to avoid tearing over the sharp edges of the plate as the compound layer softens and conforms to the plate and panel. Successful results have been achieved with thicknesses of 0.005 to 0.075 inch, and more particularly from 0.015 to 0.050 inch.

The polymers used in the top layer are, for example, ethylene ethyl acrylate with a melt index of 6 (Union Carbide 6169) added in the range of 60–70 parts per hundred, ethylene methyl acrylate with a melt index of 2 (Gulf Oil 2205) added in the range of 5–10 parts per hundred, and a linear low density polyethylene (Union Carbide 8350) with a melt index of 50 added in the range of 0–20 parts per hundred, and more particularly from 5–10 parts per hundred. The composition of the acrylate polymers is less important than the inclusion of the linear low density polyethylene. Ethylene vinyl acetate can be substituted for the combination of ethylene ethyl acrylate and ethylene methyl acrylate. The linear low density polyethylene is provided in a range of 0 to 20 parts per hundred of resin, and more specifically 5–10 parts per hundred, in order to provide sufficient resistance to tearing over the corners of the rigid plate 18. In addition, mineral or glass fillers or reinforcing fibers may be used. Calcium carbonate can be used at about 30 parts per hundred to lower the expense and provide reinforcing strength, as is known in the art. An addition of 3–5 parts per hundred, and more particularly 4 parts per hundred, of processed mineral fibers (PMF) was found to give good reinforcing. A small amount, such as 0.5%, of carbon black may be added for color.

In order to assemble the closure 12, the gasket body 31 is attached to the plate 18 in the central region of the plate 18 and of the gasket body 31. This may be accomplished by any known method, including, for example, heat staking, or heating the gasket body 31 in local areas sufficiently to cause the low melt layer 34 to be tacky and then to press the gasket body 31 against the plate 18 with a rod. The gasket body 31 can also be secured to the metal plate 18 with a few drops of a hot melt adhesive. The gasket body 31 should be attached to the plate 18 in a position sufficiently far in toward the center of the plate to allow the gasket body, which extends over the plate 18 or the periphery 38 of the gasket, to be flexed upward so that the tabs 22 and 23 are in full view of the assembler. By holding the closure 12 by the periphery 38 of the gasket body 31, which is flexed away from the plate 18, the assembler can insert tab 22 into its corresponding slot 16 and then insert tab 23 into its corresponding slot 17 in order to snap the plate 18 into place over the panel 10. The gasket body 31, which is somewhat resilient, will come back into place next to the panel 10.

The seal between the gasket body 31 and the panel 10 is effected during the baking period. During manufacture of the vehicle, the panel undergoes a baking period to harden the paint. The baking temperatures currently range from 220° F. to 235° F. Upon the initial exposure to a higher temperature, such as upon baking, the bottom low melt compound layer melts and adheres to the panel; then the second compound layer melts and conforms around the edge of the plate. This causes adhesion between the gasket body 31 and the panel 10, as is shown in FIG. 2. It is this adhesion which causes a seal between the plate 18 and the panel 10.

The panel is subjected to re-baking in order to harden paint or enamel layers as they are subjected to bake cycles. During these re-bake cycles, the gasket retains its seal. Once the gasket has conformed to the plate edges, it retains that conformation although it may become softer or even tacky on reheating.

The invention also shows excellent sealing characteristics at higher baking temperatures, ranging between 235° F. and 400° F.

The invention retains its excellent seal even after exposure to multiple baking cycles.

The present invention has shown excellent results during testing. The gasket body 31 melts and conforms during periods of increased heat to seal the intended joint against water, dust, and air intrusion. The gasket composition has no toxic or noxious odor and no adverse effect on personnel handling it. It demonstrates good shelf life and aging characteristics. The material does not crack or lose adhesion to a plate adhered to a test panel by this invention after standard industry tests, such as two 50-inch pound-inch pound impacts at −20° F.

In addition, the invention showed good sealing characteristics, even after being subjected to environmental testing.

The environmental tests performed were standard industry pushout tests measuring the force required to cause a plate sealed to a test panel to be pushed away from the test panel, as by pushing on the plate through a hole in the test panel. The plate is first sealed to the test panel by subjecting the plate and test panel to various baking temperatures and cycles, such as a cycle of 15 minutes at 300° F., 35 minutes at 325° F., and 25 minutes at 310° F.; or 22 minutes at 250° F. and, after cooling, 32 minutes more at 250° F., or one hour at 400° F. After baking has caused the gasket to seal the plate to the test panel, the test panel and plate are subjected to various tests, such as 72 hours of soaking in water at 130° F., one week of 100% humidity at 100° F., or one week of exposure to neutral salt spray, comparing to one month of exposure to salt during hard winter conditions. The test panels used were coated with various substrates, including 3043 and 3150 Uniprime, 3002 Elpo and B40 Bonderite phosphated steel. The panels which underwent the environmental treatments were compared to similar untreated control panels. Industry requires that the failure be a cohesive failure of the gasket material and not an adhesive failure of the adhesion between the gasket and the panel. The present invention uniformly demonstrated the desired cohesive failure and withheld pushout forces ranging from about 200 pounds to over 300 pounds.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A closure for a hole defined by a panel, such as a body panel in an automotive vehicle, comprising:
   a plate having dimensions complementary to the hole, and a top and bottom side;
   a gasket having a top side and a bottom side;
   the bottom side of said gasket cooperating with the top side of said plate;
   means for securing said gasket to said plate;
   means to secure the plate to said panel;
   said gasket having dimensions somewhat larger than the hole to overlie the panel defining the hole;
   the gasket having a thin, bottom side low melt compound layer of a high melt index and a thicker top side compound layer of a lower melt index, the total thickness of said gasket ranging from about 0.030 inch to about 0.065 inch; and
   upon heating, said gasket causing a substantially liquidtight seal between said plate and said panel.

2. A closure member as set forth in claim 1, wherein said seal is caused by exposure to a baking period of temperatures ranging from about 220° F. to about 235° F.

3. A closure member as set forth in claim 1, wherein the top side compound layer has a melt index from about 5.0 to about 6.0.

4. A closure member as set forth in claim 1, wherein the bottom side low melt compound layer has a melt index about 110.0 to about 115.0.

5. A closure member as set forth in claim 1, wherein the top side compound layer includes from about 5 to about 10 parts per hundred linear low density polyethylene of a melt index of about 50.

6. A closure member as set forth in claim 1, wherein the second compound layer includes from about 2 parts per hundred to about 5 parts per hundred of processed mineral fibers.

7. A closure as set forth in claim 1, wherein the bottom side low melt compound layer consists of from about 65 to about 80 parts of ethylene methyl acrylate, from about 10 to about 20 parts per hundred of calcium hydroxide, and from about 10 to about 20 parts per hundred of a tackifier.

8. A closure for a hole defined by a panel, such as a body panel in an automotive vehicle, comprising:
   a plate having dimensions complementary to the hole and a top side and bottom side;
   a gasket having a top side and a bottom side and a radially extending outer periphery;
   the bottom side of said gasket operating with the top side of said plate;
   means securing said gasket to said plate; and
   tabs which lock said plate in place on said panel;
   said radially extending outer periphery extending beyond said plate;

the gasket having a first low melt compound layer having a melt index from about 110 to about 115 and a second compound layer having a melt index from about 5 to about 6, and the total thickness of said gasket ranging from about 0.030 inch to about 0.065 inch.

9. A closure member as set forth in claim 8, wherein said seal is caused by exposure to a baking period of temperature ranging from about 220° F. to about 235° F.

10. A closure as set forth in claim 8, wherein said low melt layer comprises at least one ethylene vinyl acetate polymer, calcium hydroxide, and a tackifier.

11. A closure as set forth in claim 8, wherein said second compound layer includes a linear low density polyethylene with a melt index of about 50 and a small amount of reinforcing fibers.

12. A closure as set forth in claim 8, wherein said first low melt compound layer has a thickness of 0.003 to 0.015 inch and said second compound layer has a thickness of 0.005 to 0.075 inch.

* * * * *

UNITED STATES PATENT AND TRADEMARK OFFICE
CERTIFICATE OF CORRECTION

PATENT NO. : 4,494,671

DATED : January 22, 1985

INVENTOR(S) : Dan T. Moore, III, et al.

It is certified that error appears in the above—identified patent and that said Letters Patent is hereby corrected as shown below:

Column 1, line 36, "carried" should read --created--.

Column 6, line 41,--from-- should be inserted between the words "index" and "about".

Signed and Sealed this

Twenty-fifth Day of June 1985

[SEAL]

Attest:

DONALD J. QUIGG

Attesting Officer  Acting Commissioner of Patents and Trademarks